United States Patent
Mikami et al.

(10) Patent No.: US 9,722,485 B2
(45) Date of Patent: Aug. 1, 2017

(54) SWITCHING POWER SUPPLY DEVICE, ELECTRIC DEVICE, AND VEHICULAR DEVICE

(71) Applicant: DENSO CORPORATION, Kariya, Aichi-pref. (JP)

(72) Inventors: Yuki Mikami, Okazaki (JP); Yoshiyuki Kawase, Nagoya (JP); Toru Itabashi, Anjo (JP)

(73) Assignee: DENSO CORPORATION, Kariya (JP)

( * ) Notice: Subject to any disclaimer, the term of this patent is extended or adjusted under 35 U.S.C. 154(b) by 387 days.

(21) Appl. No.: 14/548,356

(22) Filed: Nov. 20, 2014

(65) Prior Publication Data

US 2015/0162815 A1 Jun. 11, 2015

(30) Foreign Application Priority Data

Dec. 6, 2013 (JP) .................................. 2013-253057

(51) Int. Cl.
| | |
|---|---|
| *B60R 16/03* | (2006.01) |
| *H02M 1/088* | (2006.01) |
| *H02M 1/32* | (2007.01) |
| *H02M 3/335* | (2006.01) |
| *H02M 3/158* | (2006.01) |

(52) U.S. Cl.
CPC ........... *H02M 1/32* (2013.01); *H02M 3/1582* (2013.01)

(58) Field of Classification Search
None
See application file for complete search history.

(56) References Cited

U.S. PATENT DOCUMENTS

| | | | |
|---|---|---|---|
| 5,434,474 A | * | 7/1995 | Ukita ................. H05B 41/2926 315/127 |
| 5,914,591 A | | 6/1999 | Yasuda et al. |
| 6,166,527 A | | 12/2000 | Dwelley et al. |

(Continued)

FOREIGN PATENT DOCUMENTS

| | | |
|---|---|---|
| JP | H08-009630 A | 1/1996 |
| JP | 2006-042461 A | 2/2006 |

(Continued)

OTHER PUBLICATIONS

Office Action mailed Oct. 13, 2015 in the corresponding JP application No. 2013-253057 (with English translation).

*Primary Examiner* — Jared Fureman
*Assistant Examiner* — Aqeel Bukhari
(74) *Attorney, Agent, or Firm* — Posz Law Group, PLC

(57) ABSTRACT

A switching power supply device includes a switching circuit and a control circuit. The switching circuit includes multiple switching elements, an inductor, and a capacitor. The control circuit compares an input voltage of the switching circuit with a predetermined threshold voltage set for an operation switch, and controls the switching circuit to perform the operation switch between at least two power control operations based on a comparison result. The at least two power control operations includes at least two of a buck operation, a buck-boost operation, or a boost operation. The control circuit further performs an inrush current restriction operation in response to the operation switch in order to restrict a flowing of an inrush current to one of the switching elements, which turns on and outputs the input voltage through the inductor in response to the operation switch.

8 Claims, 7 Drawing Sheets

(56) References Cited

U.S. PATENT DOCUMENTS

| | | | |
|---|---|---|---|
| 6,804,127 B2* | 10/2004 | Zhou | H02M 5/458 363/37 |
| 2004/0207373 A1 | 10/2004 | Muller et al. | |
| 2009/0085540 A1 | 4/2009 | Nishida | |
| 2009/0225575 A1* | 9/2009 | Vinciarelli | H02M 3/157 363/125 |

FOREIGN PATENT DOCUMENTS

| | | |
|---|---|---|
| JP | 2006-325281 A | 11/2006 |
| JP | 2007-288979 A | 11/2007 |
| JP | 2012-034516 A | 2/2012 |

* cited by examiner

SWITCHING POWER SUPPLY DEVICE, ELECTRIC DEVICE, AND VEHICULAR DEVICE

CROSS REFERENCE TO RELATED APPLICATION

This application is based on Japanese Patent Application No. 2013-253057 filed on Dec. 6, 2013, the disclosure of which is incorporated herein by reference.

TECHNICAL FIELD

The present disclosure relates to a switching power supply device switching an operation mode between at least two different power control operations, an electric device including the switching power supply device, and a vehicular device including the switching power supply device and being supplied with power by a vehicle battery. Herein, the at least two power control operations include at least two of a buck operation, a buck-boost operation, or a boost operation.

BACKGROUND

For example, vehicular devices are supplied with power by a vehicle battery. In a vehicle, during a cranking of an engine start, a high current flows through an engine starter of the vehicle. Thus, an input voltage, which is provided by the vehicle battery, may decrease to an extremely low voltage, such as 3 volts. Thus, during the cranking, instantaneous interruption may occur to the vehicular devices. It is desirable to supply stable power to the vehicular device even during the cranking.

Regarding above-described difficulty, the vehicular device usually includes a switching power supply device. The switching power supply device switches an operation mode, corresponding to an input voltage, from one power control operation to another power control operation. With this configuration, the switching power supply device stabilizes an output voltage even when the input voltage drastically decreases. For example, as shown in JP H10-243642 A (corresponding to U.S. Pat. No. 5,914,591 A), the switching power supply device switches the operation mode, corresponding to the input voltage, between a buck operation and a boost operation. The switching power supply device further switches the operation mode, corresponding to the input voltage, between two of the buck operation, a buck-boost operation, or the boost operation.

However, during an operation switch from one power control operation to another power control operation, substantially high inrush current flows to one of switching elements included in a switching circuit. The one of the switching elements turns on in order to output the input voltage through the inductor. Thus, during a switch of the power control operation, the output voltage of the switching power supply device may become unstable.

SUMMARY

In view of the foregoing difficulties, it is an object of the present disclosure to provide a switching power supply device, an electric device, and a vehicular device, each of which improves a stability of an output voltage during a switch of the power control operation.

According to a first aspect of the present disclosure, a switching power supply device includes a switching circuit and a control circuit. The switching circuit includes multiple switching elements, an inductor, and a capacitor. The control circuit compares an input voltage of the switching circuit with a predetermined threshold voltage set for an operation switch, and controls the switching circuit to perform the operation switch between at least two power control operations. The at least two power control operations includes at least two of a buck operation, a buck-boost operation, or a boost operation. The control circuit further performs an inrush current restriction operation in response to the operation switch in order to restrict a flowing of an inrush current to one of the switching elements, which turns on and outputs the input voltage through the inductor in response to the operation switch.

With the above switching power supply device, a stability of an output voltage of the switching power supply device is improved during a switch of the power control operation.

According to a second aspect of the present disclosure, an electric device includes the switching power supply device according to the first aspect of the present disclosure.

With the above electric device, advantage similar to the advantage provided by the switching power supply device according to the first aspect of the present disclosure is provided.

According to a third aspect of the present disclosure, a vehicular device includes the switching power supply device according to the first aspect of the present disclosure.

With the above vehicular device, advantage similar to the advantage provided by the switching power supply device according to the first aspect of the present disclosure is provided.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

First Embodiment

The following will describe a first embodiment of the present disclosure with reference to FIG. 1 to FIG. 6. In the present embodiment, a switching power supply device switches an operation mode between a buck operation and a boost operation. Hereinafter, the buck operation and the boost operation are also referred to as power control operations.

Figure 1:
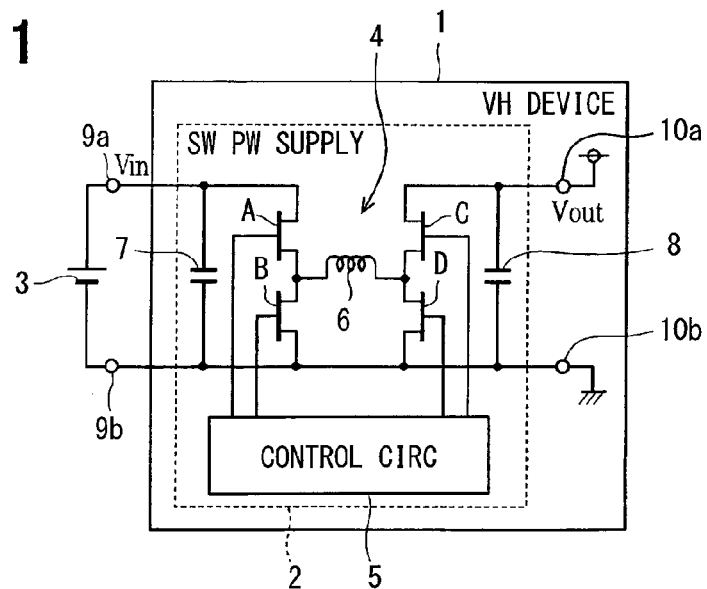
FIG. 1 is a circuit diagram showing a switching power supply device according to a first embodiment of the present disclosure.

As shown in FIG. 1, a vehicular device (VH DEVICE) 1 equipped to a vehicle includes a switching power supply device (SW PW SUPPLY) 2. The switching power supply device 2 is supplied with power by a vehicle battery 3. An input voltage Vin provided by the vehicle battery 3 is input to the switching power supply device 2. The switching power supply device 2 converts the input voltage Vin to a predetermined output voltage Vout. The switching power supply device 2 includes a switching circuit 4 and a control circuit (CONTROL CIRC) 5. The control circuit 5 controls an operation of the switching circuit 4.

The switching circuit 4 includes multiple switching elements (SW) A, B, C, D, an inductor 6, capacitors 7, 8. The switching elements A, B are disposed on an input side of the inductor 6, and the switching elements C, D are disposed on an output side of the inductor 6. Hereinafter, the switching elements A, B disposed on the input side are also referred to as input side switching elements, and the switching elements C, D disposed on the output side are also referred to as output side switching elements. Each switching element A, B, C, D is controlled to be turned on or turned off at a predetermined timing so that the input voltage Vin is converted to the predetermined output voltage Vout by increasing or decreasing the input voltage Vin.

In the switching circuit 4, a vehicle battery 3 is connected between two input terminals 9a and 9b. Further, The capacitor 7 is connected between the two input terminals 9a and 9b. The capacitor 7 is also referred to as an input side capacitor 7. The capacitor 7 absorbs a fluctuation of an input current that flows into the switching circuit 4. The two input side switching elements A, B are connected between the two input terminals 9a, 9b in series.

The two output side switching elements C, D are connected between two output terminals 10a, 10b in series. The capacitor 8 is connected between the two output terminals 10a and 10b. The capacitor 8 is also referred to as an output side capacitor 8. The capacitor 8 absorbs a fluctuation of the output current that flows out from the switching circuit 4. The output terminal 10a is connected to a positive voltage line of the vehicular device 1, and the output terminal 10b is connected to an earth line.

The inductor 6 is connected between a common connection point of the two input side switching elements A, B and a common connection point of the two output side switching elements C, D. Each switching element A, B, C, D may be provided by, for example, a metal oxide semiconductor field effect transistor (MOSFET).

A driving signal output from the control circuit 5 is input to a gate of each switching element A, B, C, D. With this configuration, the control circuit 5 is able to control the switching elements A, B, C, D so that when one of the input side switching elements A, B is turned on, the other one of the input side switching elements A, B is turned off, and when one of the output side switching elements C, D is turned on, the other one of the output side switching elements C, D is turned off. That is, the two input side switching elements A, B operate in a mutually complementary manner, and the two output side switching elements C, D operate in a mutually complementary manner.

The control circuit 5 switches the operation mode of the switching power supply device 2 between the buck operation and the boost operation by controlling the switching elements A, B, C, D included in the switching circuit 4. Specifically, the control circuit 5 controls each switching element A, B, C, D to turn off or turn on by outputting a driving signal to each switching element A, B, C, D. In the present embodiment, the driving signal is a pulse signal. The control circuit 5 further performs an inrush current restriction operation, which is performed during the operation switch between the operation and the boost operation. During the inrush current restriction operation, the pulse signal is controlled to rise up slowly. The inrush current restriction operation will be described later in detail.

The following will describe the power control operation and the switch of the power control operation performed by the control circuit 5.

Figure 2:
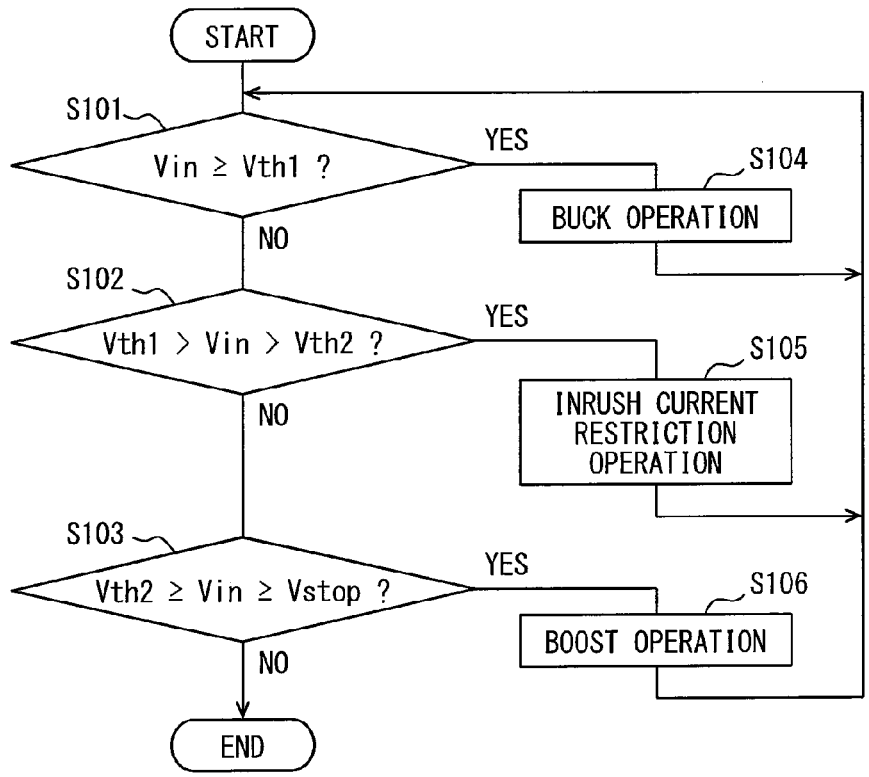
FIG. 2 is a flowchart showing an operation of a control circuit.

As shown in FIG. 2, the control circuit 5 determines whether the input voltage Vin (i) is equal to or higher than a first threshold voltage Vth1 set for an operation switch (S101), (ii) is lower than the first threshold voltage Vth1 and higher than a second threshold voltage Vth2 set for an operation switch (S102), or (iii) is equal to or lower than the second threshold voltage Vth2 and equal to or higher than a circuit stop threshold voltage Vstop (S103). The first threshold voltage Vth1 and the second threshold voltage Vth2, which are set for operation switch, are lower than a battery voltage of the vehicle battery 3. The operation switch means that the operation mode switches from one power control operation to another power control operation. Each of the first threshold voltage Vth1 and the second threshold voltage Vth2 is set as a target voltage of the output voltage Vout.

When the input voltage Vin is equal to or higher than the first threshold voltage Vth1 (S101: YES), the control circuit 5 controls the switching circuit 4 to operate in a buck mode. That is, the control circuit 5 performs the buck operation (S104).

Figure 3A:
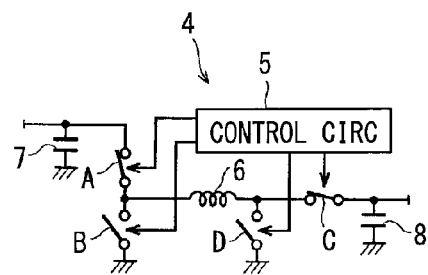
FIG. 3A and FIG. 3B are diagrams showing a buck operation of a switching circuit.
Figure 3B:
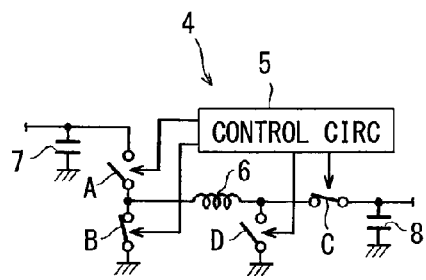

As shown in FIG. 3A and FIG. 3B, the inductor 6 is connected to the output side capacitor 8 by turning on the switching element C and turning off the switching element D. Under this connection state of the switching elements C, D, the control circuit 5 performs the buck operation by alternatively switching a connection state of the switching elements A, B between a first connection state shown in FIG. 3A and a second connection state shown in FIG. 3B.

Figure 6:
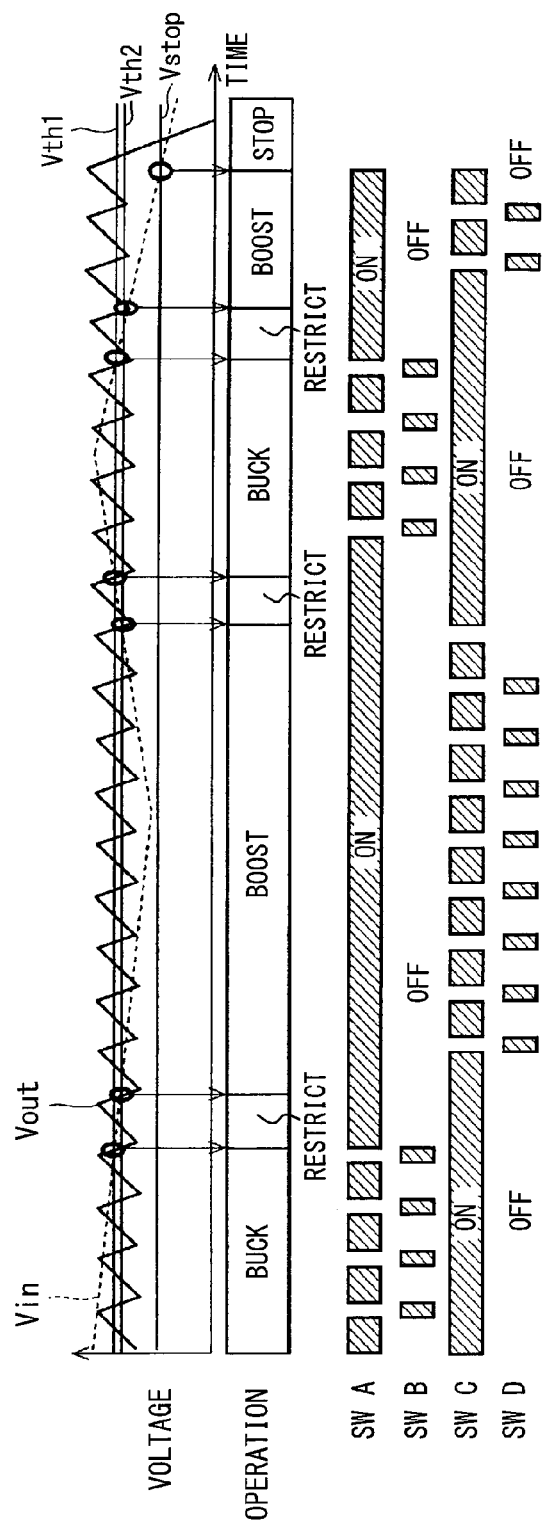
FIG. 6 is a timing chart showing each power control operation according to the first embodiment.

As shown in FIG. 6, in the first connection state, the switching element A is turned on and the switching element B is turned off so that input voltage Vin is applied to the inductor 6. In the second connection state, the switching element A is turned off and the switching element B is turned on so that zero volt is applied to the inductor 6. That is, a state in which the input voltage Vin is output to the capacitor 8 through the inductor 6 is alternatively switched with a state in which the zero volt is output to the capacitor 8 through the inductor 6. With this configuration, an average voltage applied to the capacitor 8 can be decreased to a level lower than the input voltage Vin.

When a user of the vehicle starts an engine, an engine starter of the vehicle is activated and the cranking is carried out. During the cranking, a high current flows through the engine starter of the vehicle, and the input voltage Vin provided by the vehicle battery 3 drastically decreases. As a result, the input voltage Vin becomes even lower than the first threshold voltage Vth1 or the second threshold voltage Vth2.

When the input voltage Vin is equal to or lower than the second threshold voltage Vth2, the control circuit 5 controls the switching circuit 4 to operate in a boost mode. That is, the control circuit 5 performs the boost operation. When the input voltage Vin is lower than the first threshold voltage Vth1 and higher than the second threshold voltage Vth2 (S102: YES), the control circuit 5 controls the switching circuit 4 to operate in an inrush current restriction mode. That is, the control circuit 5 performs the inrush current restriction operation (S105).

In the inrush current restriction operation, the control circuit 5 restricts a flowing of the high inrush current to the switching element A. When the buck operation is switched to the boost operation, the switching element A turns on and outputs the input voltage Vin through the inductor 6. Thus, the high inrush current flows to the switching element A. The inrush current restriction operation is performed in order to restrict the flowing of the high inrush current to the switching element A.

Figure 4:
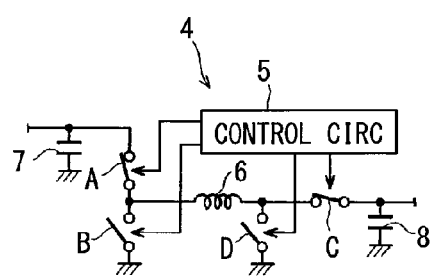
FIG. 4 is a diagram showing an inrush current restriction operation of the switching circuit.

As shown in FIG. 4, when the control circuit 5 performs the inrush current restriction operation, the control circuit 5 turns on the switching elements A, C and turns off the switching elements B, D. During a switch from the buck operation to the inrush current restriction operation, the switching element C maintains in the turned-on state and the switching element D maintains in the turned-off state. That is, during the switch from the buck operation to the inrush current restriction operation, only the switching element A turns on from an off state so that the input voltage Vin is output to the capacitor 8 through the inductor 6.

During the inrush current restriction operation, the control circuit 5 gradually increases the voltage applied to the gate of the switching element A by gradually rising up the pulse signal, which functions as the driving signal of the switching element A. Herein, a gradual increase of the voltage applied to the gate of the switching element A is also referred to as a soft turning on control. With this configuration, the current flowing to the switching element A gradually increases, and the flowing of the high inrush current to the switching element A can be restricted.

As shown in FIG. 6, after the soft turning on control, the control circuit 5 applies an ordinary gate voltage to the switching element A in order to fully turn on the switching element A. With this configuration, the input voltage Vin is output to the capacitor 8 through the inductor 6. Thus, the input voltage Vin becomes approximately equal to the output voltage Vout. The soft turning on control is performed by using a characteristic of an amplifying region of the switching element A. The amplifying region is also known as a non-saturated region. A duration of the soft turning on control is set so that the soft turning on control ends before a start of the boost operation.

When the control circuit 5 switches from one power control operation to another power control operation, the soft turning on control is only effective to the switching element that turns on and outputs the input voltage Vin through the inductor 6. Thus, when the operation mode switches from the buck operation to the boost operation, the soft turning on control is performed only to the switching element A. Further, the soft turning on control may be performed to a switching element that turns on during the inrush current restriction operation.

When the input voltage Vin decreases equal to or lower than the second threshold voltage Vth2 and equal to or higher than the stop threshold voltage Vstop (S103: YES), the control circuit 5 controls the switching circuit 4 to operate in a boost mode. That is, the control circuit 5 performs the boost operation (S106).

Figure 5A:
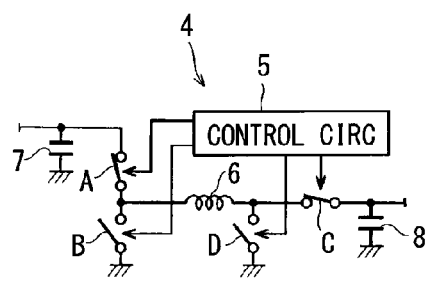
FIG. 5A and FIG. 5B are diagrams showing a boost operation of the switching circuit.
Figure 5B:
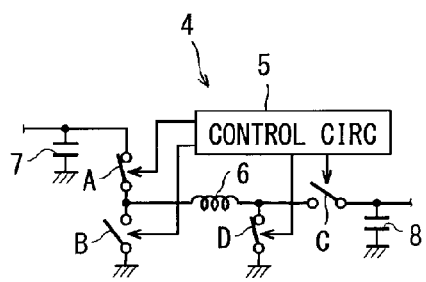

As shown in FIG. 5A and FIG. 5B, the input voltage Vin is applied to the inductor 6 by turning on the switching element A and turning off the switching element B. Under this connection state of the switching elements A, B, the control circuit 5 performs the boost operation by alternatively switching connection state of the switching elements C, D between a third connection state shown in FIG. 5A and a fourth connection state shown in FIG. 5B.

As shown in FIG. 6, in the third connection state, the switching element C is turned on and the switching element D is turned off so that the inductor 6 is connected to the capacitor 8. In the fourth connection state, the switching element C is turned off and the switching element D is turned on so that the inductor 6 is connected to zero volt. That is, in the third connection state, the inductor 6 stores energy, and in the fourth connection state, the inductor 6 releases the stored energy. By alternatively switching the third connection state with the fourth connection state, the output voltage Vout may be increased higher than the input voltage Vin.

After the start of the engine is finished, the input voltage Vin provided by the vehicle battery 3 increases higher than the second threshold voltage Vth2 (S102: YES). When the input voltage Vin increases to a level higher than the second threshold voltage Vth2, the control circuit 5 performs the inrush current restriction operation (S105). When the boost operation is switched to the buck operation, the switching element C turns on and outputs the input voltage Vin through the inductor 6 to the capacitor 8. Thus, the high inrush current flows to the switching element C. Thus, the control circuit 5 performs the inrush current restriction operation in order to restrict the flowing of the high inrush current to the switching element C.

When the control circuit 5 switches from one power control operation to another power control operation, the soft turning on control is only effective to the switching element that turns on and outputs the input voltage Vin through the inductor 6 to the capacitor 8. Thus, when the operation mode switches from the boost operation to the buck operation, the soft turning on control is performed only to the switching element C. Further, the soft turning on control may be performed to a switching element that turns on during the inrush current restriction operation.

When the input voltage Vin further increases to a level equal to or higher than the first threshold voltage Vth1 (S101: YES), the control circuit 5 performs the buck operation (S104). When the input voltage Vin drastically decreases to a level lower than the stop threshold voltage Vstop (S103: NO), the control circuit 5 stops operation and the whole electric circuit stops operation.

The following will describe advantages provided by the present embodiment. In the present embodiment, the operation mode of the switching power supply device 2 switches between the buck operation and the boost operation. In this configuration, when the operation mode of the switching power supply device 2 switches from one power control operation to another power control operation, the switching power supply device 2 performs the inrush current restriction operation in order to restrict the flowing of the high inrush current to the switching element, which turns on and outputs the input voltage Vin through the inductor 6. Thus a stability of the output voltage Vout is improved when the operation mode switches from one power control operation to another power control operation.

As the inrush current restriction operation, the control the control circuit 5 gradually increases the voltage applied to the gate of the switching element by using the characteristic of the amplifying region of the switching element. Specifically, the control circuit 5 gradually rises up the pulse signal, which functions as the driving signal of the switching element. Thus, the current flowing to the switching element gradually increases and the high inrush current can be restricted to flow to the switching element.

Second Embodiment

Figure 7:
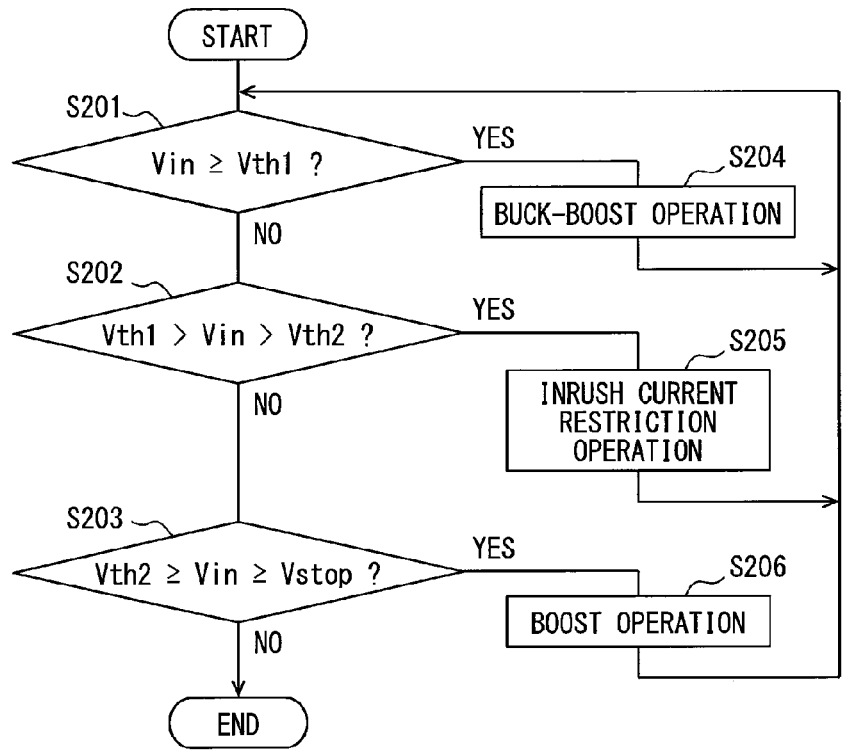
FIG. 7 is a flowchart showing an operation of a control circuit according to a second embodiment of the present disclosure.
Figure 8A:
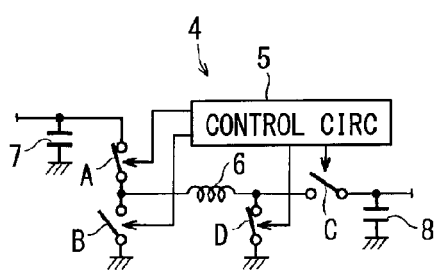
FIG. 8A and FIG. 8B are diagrams showing a buck-boost operation of a switching circuit.
Figure 8B:
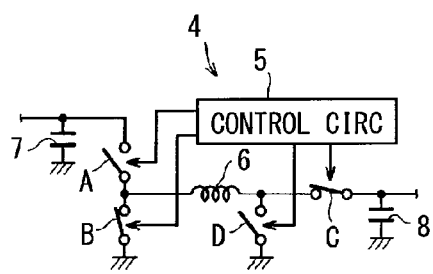
Figure 9:
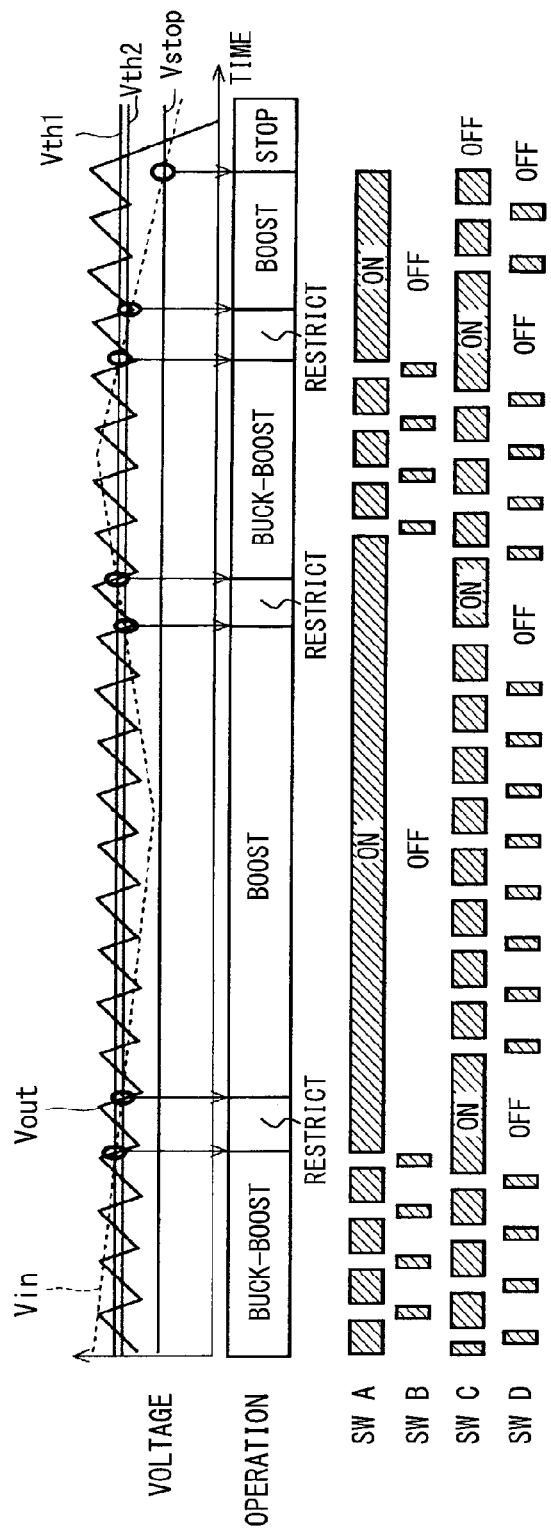
FIG. 9 is a timing chart showing each power control operation according to the second embodiment.

The following will describe a second embodiment of the present disclosure with reference to FIG. 7 to FIG. 9.

In the present embodiment, the switching power supply device 2 switches an operation mode between a buck-boost operation and the boost operation. Hereinafter, the buck-boost operation and the boost operation are also referred to as power control operations.

As shown in FIG. 7, when the input voltage Vin is equal to or higher than the first threshold voltage Vth1 (S201: YES), the control circuit 5 performs the buck-boost operation (S204). In FIG. 7, S202, S203, S205, S206 correspond to S102, S103, S105, S106 in FIG. 2 of the first embodiment, respectively. Thus, in the present embodiment, detailed description of S202, S203, S205, S206 will be omitted.

As shown in FIG. 8A and FIG. 8B, the control circuit 5 performs the buck operation by alternatively switching the connection state of the switching elements A, B, C, D between a fifth connection state shown in FIG. 8A and a sixth connection state shown in FIG. 8B. As shown in FIG. 9, in the fifth connection state, the switching elements A, D are turned on and the switching elements B, C are turned off. In the sixth connection state, the switching elements A, D are turned off and the switching elements B, C are turned on.

In the buck operation described in the first embodiment, the switching circuit 4 generates the output voltage Vout that is lower than the input voltage Vin. Thus, even when the input voltage Vin is very close to the first threshold voltage Vth1, the control circuit 5 still performs the buck operation. Thus, in a configuration where the buck operation and the boost operation are alternatively switched as described in the first embodiment, even when the input voltage Vin is close to the first threshold voltage Vth1, the output voltage Vout is decreased to lower than the first threshold voltage Vth1 by the buck operation. Thus, it is hard to control the output voltage Vout to approach to the first threshold voltage Vth1.

In the present embodiment, the buck-boost operation is performed instead of the buck operation compared with the first embodiment. In the buck-boost operation, the buck operation and the boost operation are performed alternatively in order to control the output voltage Vout to gradually approach to the first threshold voltage Vth1. With this configuration, in the present embodiment, the output voltage Vout can approach to the first threshold voltage Vth1. However, a conversion efficiency of the buck-boost operation is lower than a conversion efficiency of the buck operation. Thus, one of the boost operation or the buck-boost operation needs to be decided to be performed according to a specification of the switching power supply device 2.

The buck-boost operation may also be performed instead of the boost operation compared with the first embodiment. In this configuration, similar effects may be provided by the configuration in which the buck-boost operation is performed instead of the buck operation. However, the conversion efficiency of the buck-boost operation is lower than a conversion efficiency of the boost operation. Thus, a combination of any two of the buck operation, the buck-boost operation, or the boost operation needs to be decided according to the specification of the switching power supply device 2.

In the present embodiment, when the input voltage Vin approaches to the first threshold voltage Vth1 during the buck operation, the buck operation may be switched to the buck-boost operation. Further, when the input voltage Vin approaches to the second threshold voltage Vth2 during the boost operation, the boost operation may be switched to the buck-boost operation. When the operation mode switches from one power control operation to another power control operation, the inrush current restriction operation is performed to the switching element that turns on and outputs the input voltage Vin through the inductor 6.

In the configuration where the switching power supply device 2 alternatively performs the buck-boost operation and the boost operation according to the input voltage Vin, the high inrush current, which is generated in response to a switch of the power control operation, is restricted to flow to the switching element that turns on and outputs the input voltage Vin through the inductor 6. Thus, a stability of the output voltage Vout is improved.

Third Embodiment

Figure 10:
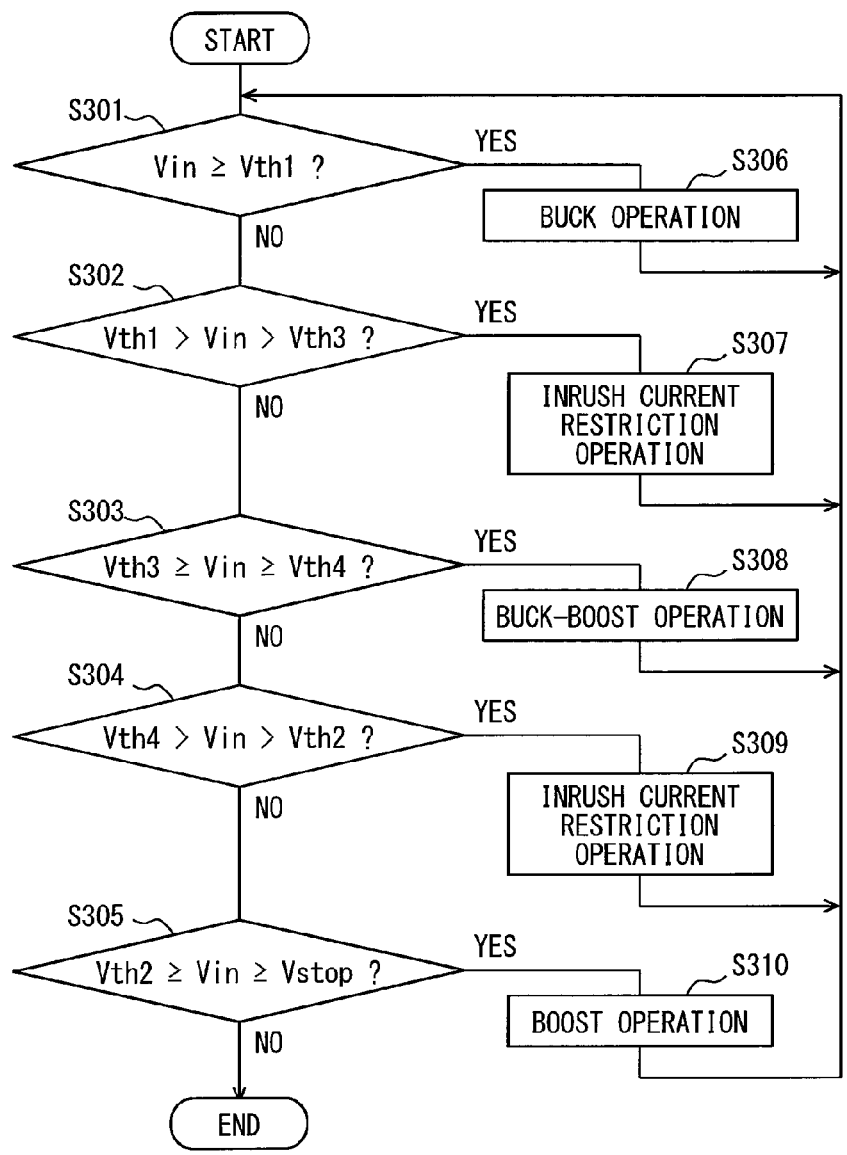
FIG. 10 is a diagram showing an operation of a control circuit according to a third embodiment of the present disclosure.
Figure 11:
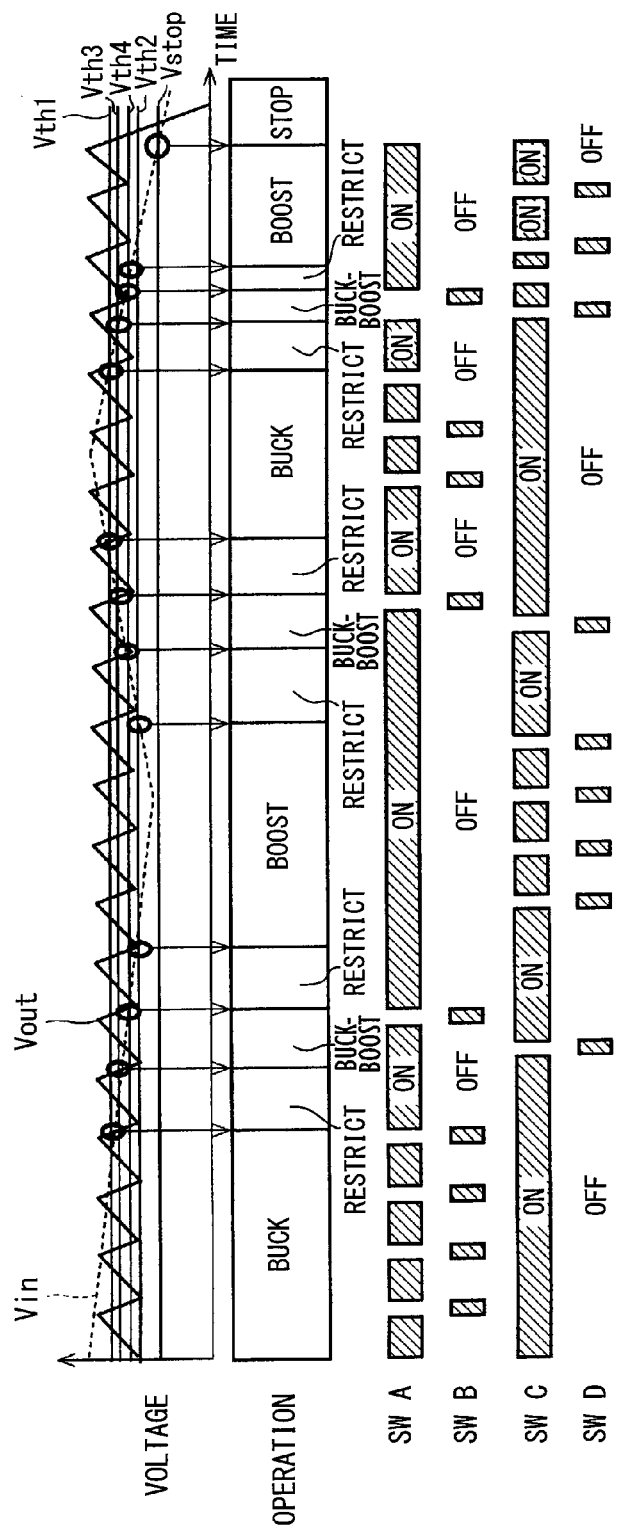
FIG. 11 is a timing chart showing each power control operation according to the third embodiment.

The following will describe a third embodiment of the present disclosure with reference to FIG. 10 and FIG. 11.

In the present embodiment, the switching power supply device 2 switches an operation mode between two of the buck operation, the buck-boost operation, or the boost operation. The buck operation, the buck-boost operation, and the boost operation are also referred to as power control operations.

In the first embodiment, the power control operation is switched between buck operation and the boost operation. In the second embodiment, the power control operation is switched between the buck-boost operation and the boost operation.

As described above, although the conversion efficiency of the buck-boost operation is lower than the buck operation or the boost operation, the buck-boost operation enables the output voltage Vout to approach to the threshold voltage set for the operation switch. Thus, when the input voltage Vin is within a range from the first threshold voltage Vth1 to the second threshold voltage Vth2, the switching power supply device 2 performs the buck-boost operation.

As shown in FIG. 10, when the input voltage Vin is equal to or higher than the first threshold voltage Vth1, the control circuit 5 performs the buck operation. When the input voltage Vin is equal to or lower than the second threshold voltage Vth2, the control circuit 5 performs the boost operation.

As shown in FIG. 11, in the present embodiment, a third threshold voltage Vth3 is set for an operation switch and a fourth threshold voltage Vth4 is set for an operation switch. The third threshold voltage Vth3 is lower than the first threshold voltage Vth1 and higher than the fourth threshold voltage Vth4. The fourth threshold voltage Vth4 is lower than the third threshold voltage Vth3 and higher than the second threshold voltage Vth2. As shown in FIG. 10 and FIG. 11, when the input voltage Vin is equal to or lower than the third threshold voltage Vth3 and equal to or higher than the fourth threshold voltage Vth4, the control circuit 5 performs the buck-boost operation.

In the present embodiment, the control circuit 5 performs the buck-boost operation when the input voltage Vin is equal to or lower than the third threshold voltage Vth3 and equal to or higher than the fourth threshold voltage Vth4. Thus, during the operation switch between the buck operation and the buck-boost operation, or during the operation switch between the boost operation and the buck-boost operation, the high inrush current may flow to the switching element that turns on and outputs the input voltage Vin through the inductor 6. Thus, the output voltage Vout may fluctuate caused by the high inrush current.

Thus, as shown in FIG. 10, when the input voltage Vin decreases to a level lower than the first threshold voltage Vth1 and higher than the third threshold voltage Vth3 (S302: YES), the control circuit 5 performs the inrush current restriction operation (S307). When the input voltage Vin further decreases to a level equal to or lower than the third threshold voltage Vth3 and is equal to or higher than the fourth threshold voltage Vth4 (S303: YES), the control circuit 5 performs the buck-boost operation (S308). By performing the buck-boost operation, the output voltage Vout can approach to the third threshold voltage Vth3 or to the fourth threshold voltage Vth4.

During the buck-boost operation, when the input voltage Vin increases to a level higher than the third threshold voltage Vth3 and lower than the first threshold voltage Vth1 (S302: YES), the control circuit 5 performs the inrush current restriction operation (S307). With this inrush current restriction operation, the high inrush current, which is generated in response to a switch between the buck operation and the buck-boost operation, is restricted to flow to the switching element that turns on and outputs the input voltage Vin through the inductor 6. Thus, a stability of the output voltage Vout is improved.

As shown in FIG. 10, when the input voltage Vin decreases to a level lower than the fourth threshold voltage Vth4 and higher than the second threshold voltage Vth2 (S304: YES), the control circuit 5 performs the inrush current restriction operation (S309).

When the input voltage Vin further decreases to a level equal to or lower than the second threshold voltage Vth2 and is equal to or higher than the circuit stop threshold voltage Vstop (S305: YES), the control circuit 5 performs the boost operation (S310).

During the boost operation, when the input voltage Vin increases to a level higher than the second threshold voltage Vth2 and lower than the fourth threshold voltage Vth4 (S304: YES), the control circuit 5 performs the inrush current restriction operation (S309). With this inrush current restriction operation, the high inrush current, which is generated in response to a switch between the buck-boost operation and the boost operation, is restricted to flow to the switching element that turns on and outputs the input voltage Vin through the inductor 6. Thus, a stability of the output voltage Vout is improved.

In the configuration where the switching power supply device 2 alternatively switches among the buck operation, the buck-boost operation, or the boost operation according to the input voltage Vin, the high inrush current, which is generated in response to a switch of the power control operation, is restricted to flow to the switching element that turns on and outputs the input voltage Vin through the inductor 6. Thus, a stability of the output voltage Vout is improved.

Other Embodiments

In the foregoing embodiments, the switching power supply device 2 is applied to the vehicular device 1. As other examples, the switching power supply device 2 may be applied to an electric device, such as a home electric appliance or an information device.

In the foregoing embodiments, the rise-up of the pulse signal that drives the switching element is slowly increased in order to restrict the inrush current. As other examples of the inrush current restriction operation, the gate voltage of the switching element may be increased in step-wise manner. Further, the switching control may be performed at a high speed within a saturated region so that the switching speed can be gradually decreased. Other configurations that restrict the inrush current may also be utilized as the inrush current restriction operation.

In the foregoing embodiments, the switching element is provided by the MOSFET. As another example, the switching element may be provided by a thyristor, an insulated gate bipolar translator (IGBT) or the like.

While only the selected exemplary embodiments have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiments according to the present disclosure is provided for illustration only, and not for the purpose of limiting the disclosure as defined by the appended claims and their equivalents.

What is claimed is:

1. A switching power supply device comprising:
   a switching circuit including a plurality of switching elements, an inductor, and a capacitor; and
   a control circuit
      comparing an input voltage of the switching circuit with a predetermined threshold voltage to determine whether to perform an operation switch,
      based on a comparison result of the input voltage and the predetermined threshold voltage, controlling the switching circuit to perform the operation switch between at least two power control operations, wherein the at least two power control operations include at least two of a buck operation, a buck-boost operation, or a boost operation, and
      performing an inrush current restriction operation in response to the operation switch in order to restrict a flowing of an inrush current to one of the switching elements,
   wherein, in the inrush current restriction operation, the control circuit controls the one of the switching elements included in the switching circuit to turn on and output the input voltage through the inductor included in the switching circuit, in response to the operation switch.

2. The switching power supply device according to claim 1,
   wherein, during the inrush current restriction operation, the control circuit controls a current flowing to the one of the switching elements to gradually increase.

3. The switching power supply device according to claim 1,
   wherein the at least two power control operations include the buck operation and the boost operation.

4. The switching power supply device according to claim 1,
   wherein the at least two power control operations include the buck-boost operation and the boost operation.

5. The switching power supply device according to claim 1,
   wherein the at least two power control operations include the buck operation and the buck-boost operation.

6. The switching power supply device according to claim 1,
   wherein the at least two power control operations include the buck operation, the buck-boost operation, and the boost operation.

7. An electric device comprising
a switching power supply device,
wherein the switching power supply device includes:
    a switching circuit including a plurality of switching elements, an inductor, and a capacitor; and
    a control circuit
        comparing an input voltage of the switching circuit with a predetermined threshold voltage to determine whether to perform an operation switch,
        controlling the switching circuit to perform, based on a comparison result of the input voltage and the predetermined threshold voltage, the operation switch between at least two power control operations, the at least two power control operations including at least two of a buck operation, a buck-boost operation, or a boost operation,
        performing an inrush current restriction operation in response to the operation switch in order to restrict a flowing of an inrush current to one of the switching elements, and
        controlling the one of the switching elements included in the switching circuit to turn on and output the input voltage through the inductor included in the switching circuit in response to the operation switch.

8. A vehicular device equipped to a vehicle comprising
a switching power supply device,
wherein the switching power supply device includes:
    a switching circuit including a plurality of switching elements, an inductor, and a capacitor; and
    a control circuit
        comparing an input voltage of the switching circuit with a predetermined threshold voltage to determine whether to perform an operation switch,
        controlling the switching circuit to perform, based on a comparison result of the input voltage and the predetermined threshold voltage, the operation switch between at least two power control operations, the at least two power control operations including at least two of a buck operation, a buck-boost operation, or a boost operation,
        performing an inrush current restriction operation in response to the operation switch in order to restrict a flowing of an inrush current to one of the switching elements, and
        controlling the one of the switching elements included in the switching circuit to turn on and output the input voltage through the inductor included in the switching circuit in response to the operation switch.

\* \* \* \* \*